Nov. 7, 1933.   N. P. SOFTIS   1,934,382
PARACHUTE AND PARACHUTE LAUNCHING MEANS
Filed Feb. 23, 1932   3 Sheets-Sheet 1
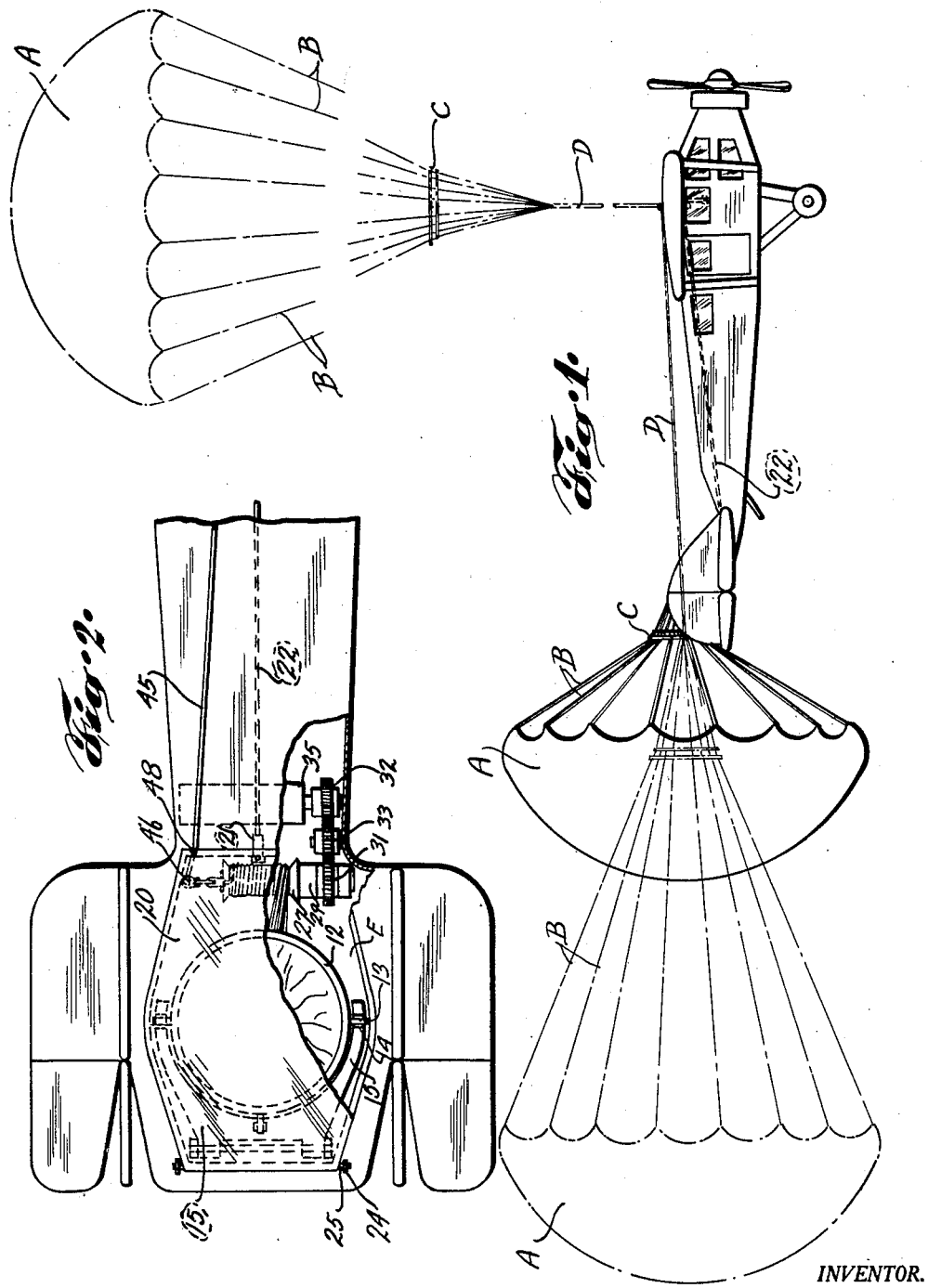
INVENTOR.

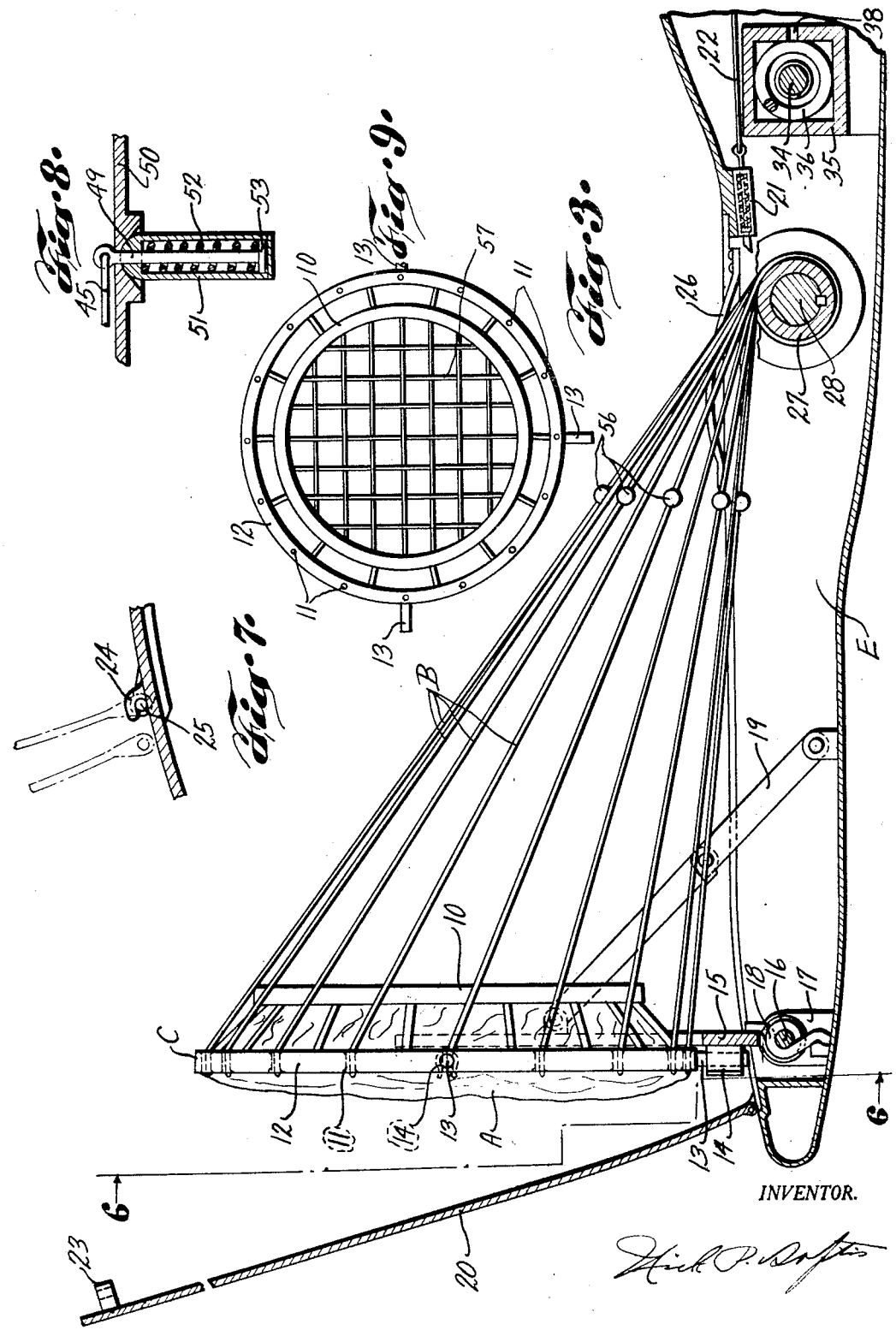

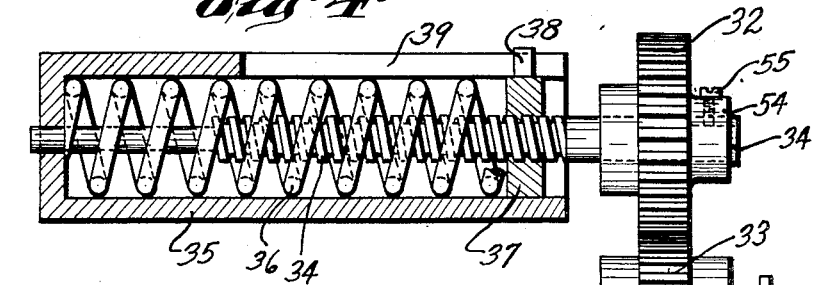
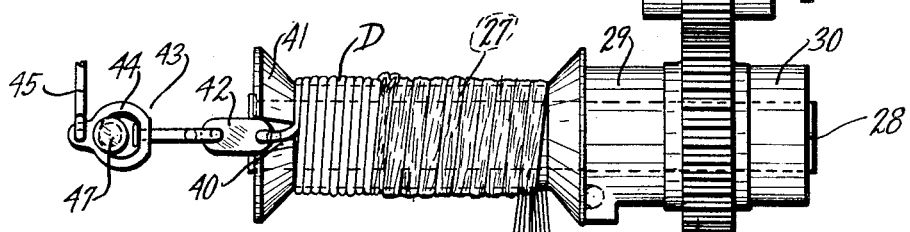
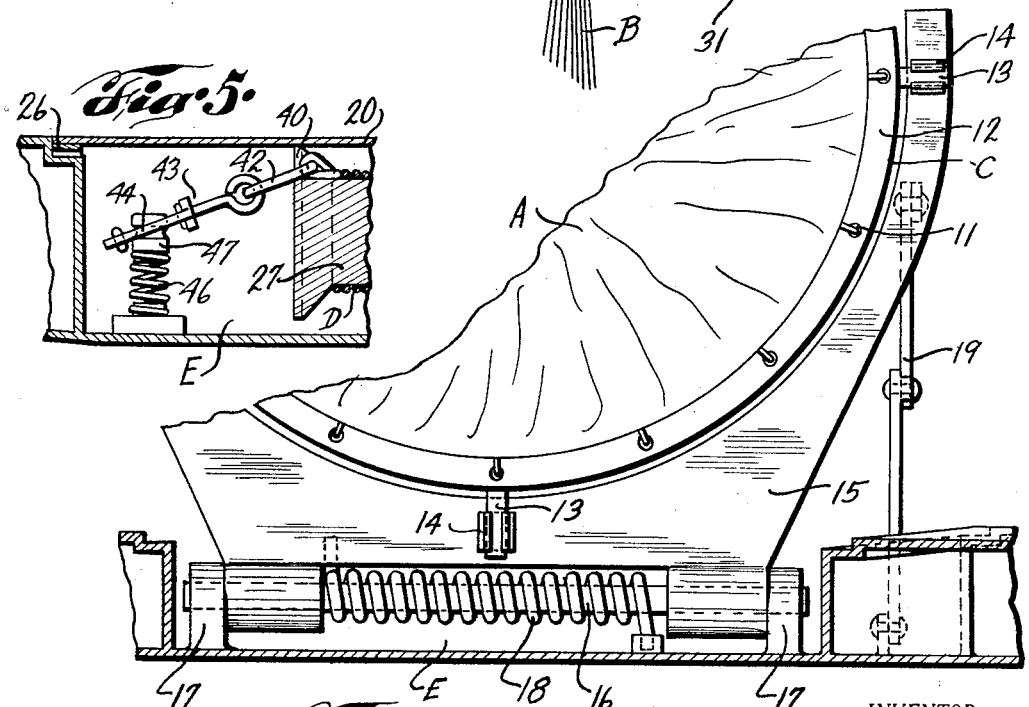

Patented Nov. 7, 1933

1,934,382

UNITED STATES PATENT OFFICE 1,934,382

PARACHUTE AND PARACHUTE LAUNCHING MEANS

Nick P. Softis, St. Louis, Mo.

Application February 23, 1932. Serial No. 594,568

14 Claims. (Cl. 244—21)

My invention relates to safety devices for aircraft, and more particularly to improvements in parachutes, and parachute launching means of the general type set forth in my copending application, Serial No. 472,455, filed August 1, 1930.

It is believed that flying hazards can be minimized and almost entirely eliminated by the provision, on every airship, of a parachute having sufficient size and strength to sustain the entire craft and its load, and which is adapted safely to lower the craft to the ground should trouble occur. Heretofore, such devices have been impractical, primarily because of the difficulties encountered in successfully launching the parachute. Obviously, if the craft is to be suspended in a substantially horizontal, upright position, the parachute cords must necessarily be secured to the craft at a point near its center of gravity, which point is usually located near the forward end of the fuselage. Because of this fact, former designs provided for the parachute being carried and released from a point located forwardly and centrally of the aeroplane. Launching the parachute from such location is an exceedingly precarious operation, since the cords are highly susceptible of becoming entangled, or fouled upon the tail of the disabled craft, which portion, in most instances, assumes an uppermost position when the craft is falling.

Danger of the parachute becoming fouled on the tail gear has been removed in the presently described arrangement by the provision of means for releasing a parachute from a point near the tail end of an aeroplane, the parachute cords duly engaging the craft at such location until the bag has become fully inflated. Thereafter, the point of connection, or suspension, is automatically transferred to the forward end of the aeroplane where the parachute cords are secured, the point of securement being preferably located near the center of gravity of the aeroplane.

Thus, an object of the present invention is to provide a parachute, attendant to an aeroplane, and improved means for launching the parachute therefrom, the launching means being designed and arranged to preclude any possibility of the parachute becoming fouled, or otherwise unduly interfered with, by the aeroplane structure.

Another object of my invention resides in the provision of improved means for initiating the launching of a parachute from a folded position within the aeroplane.

Another object of my invention resides in the provision of means for preventing entanglement of the parachute cords.

Yet another object is to provide an improved reel or windlass device which is adapted to have the cords windingly disposed thereon, and means associated with the reel for yieldingly opposing the outward movement of the cords, the purpose being to prevent damage to the aeroplane and parachute, by cushioning the shock which would otherwise result when the parachute assumes its load.

A further object is to provide means which enable disengagement of the cords from the reel when the parachute is entirely unfurled.

These, and other objects and advantages will be more fully understood from the following detailed description and accompanying drawings:

In the drawings, Fig. 1 illustrates an aeroplane provided with the device of my invention, the parachute being shown in three successive positions. In Fig. 1 the full line drawing of the parachute shows a position which that member will assume immediately after having been released; Fig. 2 is a top plan view of the tail portion of an aeroplane, showing a preferred location of the parachute apparatus when not in use. In Fig. 2 a section of the fuselage has been broken away to illustrate, with greater clarity, certain portions of the device; Fig. 3 is a sectional side elevation, showing various parts in position to cause launching of the parachute; Fig. 4 is a plan view of a presently preferred form of retarding means; Fig. 5 is a sectional elevation, illustrating a spring post and swivel joint for the parachute cords; Fig. 6 is a frictional sectional view taken along line 6—6 of Fig. 3; Fig. 7 is a sectional elevation, showing a preferred form of hinging device for a door which covers a fuselage, parachute-receiving compartment; Fig. 8 is a sectional elevation, showing a preferred form of buffer, or cushioning device, for attaching the end of the parachute cord to the aeroplane; and Fig. 9 is a plan view of the member adapted to receive and position the parachute when folded.

Referring now, by characters of reference to the drawings, A (Fig. 1) indicates the cloth, or bag portion of a parachute, of sufficient size and strength to lower an aeroplane and its load safely to the ground. The parachute may be of usual form, having a plurality of cords B which are slidably disposed through spaced, peripheral apertures in an annular member C, best appearing in Fig. 9. The cords B are joined together and prolonged, preferably by means of a single cord D of substantial length, the cord D being anchored to the aeroplane at a point near its center of gravity, Under normal conditions, the bag A is disposed in folded position within a suitable compartment E, (Fig. 3), preferably located near the tail end of the aeroplane, from which location the parachute is adapted to be launched. The cords B and D are windingly disposed on a reel or windlass mechanism which may be conveniently located within the fuselage of the aeroplane, adjacent the compartment E. As will be hereinafter more fully explained, the windlass device serves to restrain free outward movement of the cords and thereby to control the action of the parachute during launching. When initially launched, the parachute tends to retard the forward motion of the aeroplane, the retarding force being applied to the aeroplane at the windlass member. However, since it is not desirable to suspend the craft from its tail end, where the windlass is preferably located, means are provided which free the cords of the reel, when fully unwound therefrom, the point of suspension being automatically transferred from the windlass member to a point of anchorage located as hereinabove mentioned.

Describing now, the various parts in greater detail, the annular member C is normally disposed within the compartment E, and arranged to receive and support the bag A when folded. The member C, by preference, consists of a shallow, annular basket, the bottom of which is formed of lacings 57, which are strung across the face of a lower ring portion 10. The lacings, by preference, are sufficiently spaced to permit air to pass freely therethrough. As has been previously mentioned, the parachute cords B are disposed for sliding movement through a series of peripheral apertures 11 in an upper ring portion 12 of the member C. A plurality of studs 13, projecting radially outwardly from the ring 12, are adapted to be releasingly engaged by resilient clevis members, or spring clips 14, disposed on a hinging carriage. The carriage preferably consists of a relatively flat, bifurcate bracket member 15, normally disposed within the compartment. A shaft 16, extending transversely of the longitudinal axis of the aeroplane, near the rear end of the compartment E, is supported between bearing arms 17 which are fixedly secured to the fuselage frame. The bracket 15 is mounted for pivoted movement about the shaft 16, which preferably carries a torsional spring 18. This spring tends rotatingly to displace the carriage and annular member C from a position within the compartment as shown in Fig. 2, to a position substantially at a right angle to the longitudinal axis of the aeroplane, as is best illustrated in Fig. 3. The carriage is provided with means for limiting its rotational movement when the recited angular position is obtained, such means, in the present example, consisting in a pair of jointed arms, one of which is indicated at 19, disposed on opposite sides of the carriage.

Normally, the action of the spring 18, which tends to swing the annular member C and its contained parachute bag out of the compartment E, and into the slip stream of the aeroplane, is opposed by a cover panel, or door 20, which is adapted to be latched over, and form a closure for the compartment E. By preference, the door 20 is arranged to be hingedly secured at the rear edge of the compartment. A latching device 21, operable from the pilot's seat as by means of a release cord 22, is adapted to engage a keeper element 23, which depends from the forward, or free end of the door. To preclude any possibility of the door 20 interfering, or becoming fouled on the parachute, as the latter member is being launched, the door is preferably arranged to become detached immediately after opening, and to drop free of the aeroplane. The loss of the closure panel will not be of serious moment, since it may be inexpensively constructed, for example of sheet metal, as shown, or may consist of a fabric covered frame. In either instance, the door should be of sufficient strength to constrain the parachute within the compartment.

Fig. 7 illustrates a preferred form of hinging arrangement of the door. As may be observed, journal members 24, are recessed so as to present a rearwardly opening bearing seat for trunnions 25 on the door. Obviously, air pressure on the inner side of the door, when open, will cause the trunnions to slide out of the journal members 24, permitting the door to be blown free of the aeroplane, and out of the path of the opening parachute. Leaf springs, one of which is indicated at 26, (Fig. 3), are preferably provided, and serve to augment the action of spring 18 in throwing open the door when the latching device 21 is actuated. While a presently preferred arrangement for mounting a compartment cover or door has been illustrated, it will appear obvious that any door arrangement which allows the space behind the aeroplane to be unobstructed, will be suitable. As an example of such alternative arrangement, a pair of closure panels (not shown) may be provided, hinged on opposite side margins of the compartment, for lateral swinging movement relative to the normal path of travel of the aeroplane.

Turning now to a description of the windlass or retarding mechanism hereinbefore mentioned, which mechanism enables the parachute cords to be paid out gradually under the action of the inflating bag, and thereby serves to prevent entanglement and fouling of the cords and precludes a sudden and possibly damaging jerk when the parachute assumes its load, such mechanism or device is preferably located within the fuselage, adjacent the compartment E. It will appear obvious that the parachute cords must, of necessity, be considerably greater in length than the distance between the compartment E, where the bag A is lodged when folded, and the point of anchorage, located near the forward end of the fuselage. The surplus cordage, by preference, is windingly disposed on a reel member 27. As best appears in Fig. 4, the reel 27 is journalled only at one of its ends, the opposite end remaining free of any supporting structure. This arrangement, in connection with other provisions to be hereinafter described, enables the cords to become entirely disassociated from the reel.

The reel 27 is fixed for rotation with its shaft 28, a portion of which projects beyond one end face of the reel. Such portion is journalled in a pair of spaced bearing members 29 and 30. A gear 31, keyed or otherwise suitably fixed for rotation with the shaft 28, and carried thereby between the bearings 29 and 30, coacts with a gear 32 through an idler or spacing gear 33. The gear 32 is mounted on one end of a threaded shaft 34 which extends into an elongate housing 35. Disposed within the housing 35 is a helical compression spring 36, arranged to oppose inward movement of a traveling nut 37, carried by the threaded portion of the shaft 34. Relative rotation of the nut 37 and housing 35, may be prevented by providing the nut with a lateral stud 38, which is disposed for movement in a longitudinal slot or recess 39, in the wall of the housing.

From the foregoing it may be observed that rotation of the reel 27 in one direction causes the nut to move inwardly of the housing and thereby to compress the spring 36, the action of which is yieldingly to oppose such rotation. Thus, assuming the parachute cords to be wound on the reel as shown in Fig. 4, it will appear that unwinding rotation of the reel, incident to parachute launching, will be gradually, increasingly opposed by the action of the spring 36 on the nut 37.

While I have shown a presently preferred cord retarding device, it will appear obvious that other constructions serving the same purpose may be substituted for the one illustrated. For example, the gearing and spring housing 35 may be eliminated by utilizing the space within a hollow reel member for accommodating a spring, corresponding to the spring 36. In such modified form, the reel member may be provided with internal threads adapted to coact with external threads on a rider element disposed within the reel and adapted for endwise movement relative thereto, to compress the spring. Obviously, the spring may be replaced by hydraulic or pneumatic reel retarding means.

Referring now to the provision which enables the cord to disassociate itself from the reel after it has become unwound, as best appears from Figs. 4 and 5, a longitudinally disposed slot, or recess 40 is provided in the end flange 41, of the reel. A portion of the cord D extends through the recess 40 and is secured to a link member 42 of a swivel joint, designated generally at 43. Linked with member 42, is an eye member 44, to which is secured a section 45 of the cord D. The swivel joint is adapted to be supported in an angular position by means of a vertically projecting spring post 46, which is preferably spaced from the end of the reel. The spring post is provided with an annularly grooved head portion 47 which extends into, and frictionally engages the eye member 44. The cord section 45 is passed through a recess or notch 48 (Fig. 2), in the end of the compartment cover 20 and extends toward the front of the aeroplane where it is secured.

Fig. 8 illustrates a presently preferred arrangement for securing, or anchoring the cords 45 to the aeroplane. A buffer or cushioning device is provided, consisting of a plunger rod 49 which projects through an opening in a supporting bracket, a portion of which is indicated at 50, Fig. 8. The under side of the bracket 50 is recessed adjacent said opening to provide a bearing seat for receiving the rounded end portion of a hollow cylindrical spring housing 51. The plunger rod 49 extends axially into the housing 51 and carries a helical buffer spring 52 which is compressed between an enlarged end portion 53 of the rod 49 and the upper end wall of the spring housing 51.

In the present example, the parachute is shown permanently secured to the aeroplane by means of the device illustrated in Fig. 8. It may be desirable, in certain instances, to enable the parachute to be entirely disconnected from the aeroplane immediately after the craft comes to the earth, the purpose of which is to prevent damage to the craft by reason of its being dragged along the ground by a wind inflated bag. Hence, a suitable releasing device (not shown) operable from the cock-pit, or actuated automatically by a force on the landing gear, may be provided in connection with the anchoring assembly of Fig. 8.

Referring again to Fig. 4, it may be observed that gear 32 is provided with a laterally projecting hub portion 54. A set screw 55 extends radially through such hub portion into a keyway in the threaded shaft 34, thereby locking the gear and shaft against relative rotation. By loosening the set screw 55, the gear 32 may be disengaged from gear 33, by displacing gear 32 endwardly of the shaft 34. This expedient facilitates the winding operation, since, by disengaging gears 32 and 33, the reel member may be rotated to wind the cords thereon, without disturbing the spring 36. The idler gear 33 is preferably fixed for rotation with its shaft, which, in the present example extends beyond the face of the gear for engagement with a winding tool (not shown).

While the operation of my device is thought to be obvious from the foregoing description and drawings, the following is set forth for purposes of completeness.

Assuming that the aeroplane has become disabled during flight, to release the parachute, the pilot pulls the cord 22, which extends to the cock-pit as shown in Fig. 1, and thereby releasingly actuates the door latching device 21. Under action of springs 18 and 26, and the wind force on its under surface, the door is opened and becomes disengaged from the aeroplane, dropping to the ground. The annular member C, rotated into the position appearing in Fig. 3, displaces the folded parachute into the slip stream, and the parachute becomes inflated, as shown in full lines in Fig. 1. The outward movement of the parachute cords is accompanied by unwinding rotation of the reel 27, which movement is yieldingly opposed by the action of the spring 36 on the traveling nut 37.

The cords B slide through the apertures 11 in the member C until ball stops, carried by certain of the cords B, and indicated at 56, are brought into engagement with, and exert a force on the ring part 12 of the member C. By reason of such force on the annular member, the studs 13 are released from the spring clips 14, and the member C, now supported on the ball stops 56, is carried away from the carriage member 15, as shown in the broken lines in Fig. 1.

When completely unwound, the cord D, riding over the end of the reel member, causes the swivel joint 43 to become detached from the spring post 46, and thereafter the aeroplane is supported in a substantially horizontal position from a point near its forward end. Obviously, the slight jolt on the aeroplane, incident to the transposition of the suspension point, will be assimilated by the buffer spring 52.

From the foregoing it will appear that means constructed in accordance with my invention, will enable a parachute to be launched from an aeroplane with assurance that the parachute will open properly, and that there will be no undue strains in the cords when the parachute assumes its load. The resilient retarding mechanism, which forms a salient feature of the present invention, allows the cords to be paid out gradually and smoothly.

Having described my invention with reference to a particular preferred embodiment thereof, it will appear that many changes may be made in the various parts and their positions, parts may be added, deleted, or interchanged without departing from the spirit and full intended scope of my invention.

I claim:

1. In combination with an aeroplane, a parachute compartment therein, a parachute bag, a receptacle element normally disposed within said compartment arranged to receive the parachute bag, means for displacing said receptacle to launch the parachute, a windlass member, parachute cords secured to the aeroplane and adapted normally to be wound on said windlass member, means associated with the windlass member enabling the cords to be freed therefrom when fully unwound, and means associated with said member adapted yieldingly to oppose rotation thereof in a direction to unwind said cords.

2. In combination with an aeroplane having a parachute compartment, displaceable means within said compartment adapted to receive a folded parachute bag, a parachute having cords anchored to the aeroplane, a rotatable member adapted normally to have the cords wound thereon, and means actuated by said member adapted yieldingly to oppose, with gradually increasing effectiveness, rotation of said member tending to unwind said cords.

3. In combination with an aeroplane having a parachute compartment, a parachute normally carried within said compartment and having its cords anchored to the aeroplane at a substantial distance therefrom, a reel member arranged to receive the parachute cords, said cords adapted to be disengaged from said reel when entirely unwound therefrom.

4. In combination with an aeroplane having a parachute compartment, a parachute normally carried within said compartment, a reel member, parachute cords secured to the aeroplane and adapted to be wound on said reel member and disengaged therefrom when entirely unwound, and means for yielding opposing unwinding movement of said reel.

5. In combination with an aeroplane having a parachute compartment near the tail end thereof, a parachute arranged to be folded within said compartment and having its cords secured to the aeroplane at a point near its center of gravity, a reel member located near said compartment adapted to have the cords wound thereon, said cords being disengageable from said reel when fully unwound.

6. In combination with an aeroplane, a parachute, a relatively shallow, open ended container adapted to receive the parachute when folded, supporting means for said container mounted for hinging movement on said aeroplane. and means detachably connecting said container and supporting means.

7. In combination with an aeroplane, a relatively shallow container adapted to receive a folded parachute, said container having a series of peripheral apertures therein; a parachute having cord members disposed for sliding movement through said container apertures, and a frame member, hingedly secured to the aeroplane and adapted releasingly to support said container.

8. A supporting structure for a folded parachute, including a relatively shallow parachute receptacle having a foraminous bottom portion, a frame member having spaced arms adapted to support said receptacle therebetween, means on said frame member for releasably engaging said receptacle, and means for pivotally mounting said frame member on an aeroplane.

9. In a safety device for aeroplanes, a frame member adapted to be hingedly secured to an aeroplane, a member, carried by said frame member, adapted to receive a folded parachute, and means detachably connecting said members.

10. Safety apparatus for aircraft including in combination, a parachute, means, normally carried by the aircraft, adapted to receive the parachute when folded, and adapted to be carried by the parachute cords after the parachute is fully launched, and means, actuated by the tension in the parachute cords during launching, for increasingly opposing the outward movement of said parachute relative to the aeroplane.

11. In a safety device for aeroplanes, a parachute, a member adapted to receive the parachute when folded, a movable supporting structure adapted to displace said member into the aeroplane slip stream, whereby to initiate launching of the parachute, and means actuated by the tension in the cords of the parachute during launching thereof, for resisting with gradually increasing effectiveness the outward movement of the parachute.

12. In a safety device for aeroplanes, a parachute, a parachute receiving member, hinged supporting means for said member arranged to be swung in the aeroplane slip stream to launch the parachute, means detachably connecting said member and supporting means, and means for retarding the outward movement of said parachute.

13. In a safety device for aeroplanes, a parachute, an annular receptacle having a laced, openwork, bottom portion adapted to receive the parachute when folded, radially extending studs on said receptacle, a relatively flat, bifurcate frame, resilient clevis elements on said frame adapted releasingly to engage said receptacle studs, means for hingedly mounting said frame on an aeroplane, and spring biasing means for said frame.

14. In combination with an aeroplane, a safety device including an annular receptacle having a foraminous bottom portion, a parachute normally disposed in said receptacle and having cords passing freely through spaced peripheral apertures in said receptacle, projections extending radially from said receptacle, a relatively flat, bifurcate frame having spring clips releasably engaging said projections, said frame being hingedly mounted on the aeroplane, a spring for actuating said frame, a reel member adapted windingly to receive a portion of the parachute cords, means adapted to oppose unwinding rotation of said reel member and means located distantly of said reel member for securing the parachute to the aeroplane.

NICK P. SOFTIS.